(12) United States Patent
Raichle et al.

(10) Patent No.: US 6,558,157 B1
(45) Date of Patent: May 6, 2003

(54) ROTARY DRUM WITH ROLLING BODY ARRANGEMENT

(75) Inventors: Peter H. Raichle, Dorsten (DE); Wolfgang Mai, Gelsenkirchen (DE); Harry F. Werner, Essen (DE); Gaston F. V. Vangilbergen, Gelsenkirchen (DE)

(73) Assignee: Veba Oel Technologie und Automatisierung GmbH, Gelsenkirchen (DE)

( * ) Notice: Subject to any disclaimer, the term of this patent is extended or adjusted under 35 U.S.C. 154(b) by 0 days.

(21) Appl. No.: 10/045,390

(22) Filed: Nov. 9, 2001

(30) Foreign Application Priority Data

Nov. 13, 2000 (DE) .................................. 200 19 275 U
Nov. 13, 2000 (DE) .................................. 200 19 276 U

(51) Int. Cl.[7] ............................................. C27D 23/00
(52) U.S. Cl. .................................... 432/75; 432/103
(58) Field of Search ................. 432/103, 75; 15/104.16, 15/104.09, 104.095

(56) References Cited

U.S. PATENT DOCUMENTS

| | | | |
|---|---|---|---|
| 3,667,743 A | * 6/1972 | Kovalcik et al. | 432/75 |
| 3,848,289 A | * 11/1974 | Bachmann | 15/246.5 |
| 3,918,375 A | * 11/1975 | Hayakawa et al. | 110/246 |
| 4,102,001 A | * 7/1978 | Baba et al. | 15/104.096 |
| 4,775,315 A | 10/1988 | Schweder et al. | |
| 4,907,543 A | * 3/1990 | Matranga et al. | 122/379 |
| 5,082,441 A | 1/1992 | Schweder et al. | |
| 6,000,936 A | 12/1999 | Taquet | |
| 6,193,505 B1 | * 2/2001 | Schleiffer et al. | 432/103 |

FOREIGN PATENT DOCUMENTS

| | | |
|---|---|---|
| DE | 402 290 | 9/1924 |
| DE | 447 191 | 7/1927 |
| DE | 27 39 148 | 3/1979 |
| DE | 36 41 731 | 6/1988 |
| EP | 0 205 651 | 9/1985 |
| EP | 0 340 438 | 3/1989 |
| EP | 0 342 417 | 4/1989 |
| FR | 804 688 | 10/1936 |

* cited by examiner

Primary Examiner—Jiping Lu
(74) Attorney, Agent, or Firm—Fay, Sharpe, Fagan, Minnich & McKee

(57) ABSTRACT

A rotary drum for carrying out chemical processes at elevated temperatures which includes a rolling body arrangement for cleaning the interior of the drum, a stationary feed end for the material to be treated, a mounting device for the rolling body arrangement on the feed end of the rotary drum, and a rotary bearing that allows the rolling body to roll on the inner side of the rotary drum wall and which connects the rolling body to the mounting device. The rotary drum further including an oblong scraping device which is arranged between the mounting device and said rotary bearing. Since the scraping device is mounted on the mounting device, it is able to carry out a pendulum motion in at least one direction, but unable to turn about itself, and the end of the scraping device on the side of the rotary bearing is connected to the rotary bearing in such a way that it is able to carry out a pendulum motion in at least one direction.

34 Claims, 6 Drawing Sheets

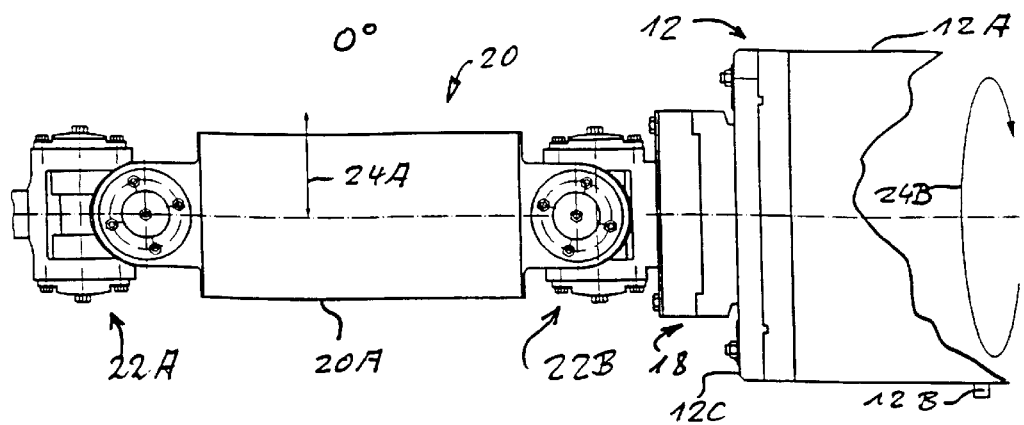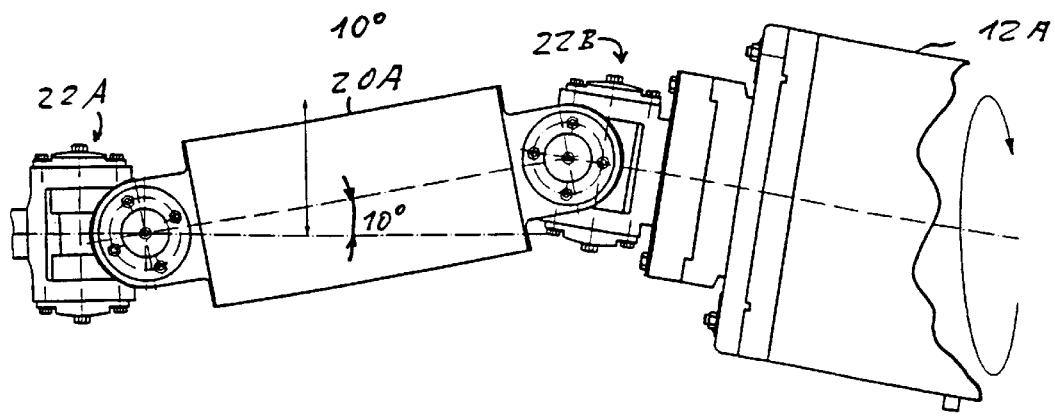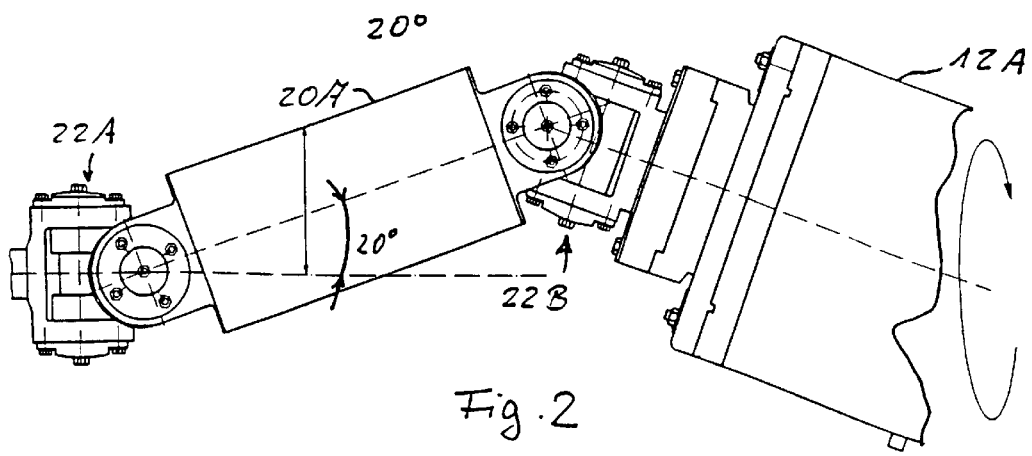
Fig. 2

ROTARY DRUM WITH ROLLING BODY ARRANGEMENT

The invention pertains to a rotary drum with a rolling body for cleaning the interior of the rotating drum. The rolling body arrangement includes a stationary feed end for the material to be treated, a mounting device for mounting the rolling body arrangement on to the feed end of the rotary drum and a rotary bearing that allows the rolling body to roll on the inner side of the rotary drum wall and which connects the rolling body to the mounting device.

BACKGROUND OF THE INVENTION

Rotary drums of this type are primarily used in chemical processes that are, in particular, carried out at elevated temperatures, e.g., carbonization processes. In this case, the operating temperatures in the interior of the drum that is externally heated in most instances may lie on the order between 600° C. and 850° C. Naturally, the operating temperatures may also be higher or lower. So-called rolling bodies are used for continuously removing deposits that are caked, encrusted or the like on the interior of the rotary drum, wherein said rolling bodies roll on the interior of the rotary drum due to its rotation and entirely or partially remove or prevent an extensive built-up of such deposits on the inner wall of the rotary drum with cleaning strips provided on the outside of the rolling bodies.

In the rotary drum known from DE 27 39 148 C3, some oblong scraping devices are coupled at distances one behind the other by chains. This allows pendulum movements only, but no rolling/rotating cleaning movements for any of the scraping devices.

In the rotary drum known from WO 9839611, which is internally cleaned by means of rolling bodies, the typically non-cylindrical and cylindrical inner wall regions of the feed end of a rotary drum are cleaned with a combination of rolling bodies, the cleaning surfaces of which are arranged at an angle relative to one another. This cleaning arrangement is preferably realized in the form of several successively coupled rolling bodies that are equipped with a ball joint on their ends that are situated on the feed side in order to allow the rolling motion. However, practical tests demonstrated that these cleaning arrangements can be additionally improved in order to achieve a superior cleaning of the rotary drum interior in the end region on the feed side and a long service life of the rolling body bearings, preferably such that the maintenance intervals at least correspond to or exceed the typical downtimes of the rotary drum. Also, these tests have demonstrated that ball joints of this type do not have a satisfactory service life.

SUMMARY OF THE INVENTION

Based on the above-mentioned circumstances, the invention is based on the objective of additionally improving the cleaning of the inner wall in the feed region in rotary drums of this type. According to another objective, the invention, aims to ensure a low-maintenance operation of the cleaning devices in rotary drums of the initially described type and, in particular, to improve the service life of the bearings used for the cleaning bodies.

According to the invention, this objective is attained with a rotary drum that is realized in accordance with a rolling body arrangement according to the present invention. In this respect, this result is achieved with a rotary drum that includes a rolling body arrangement for cleaning the interior of the drum, a stationary feed end for the material to be treated, a mounting device for mounting the rolling body arrangement on to the feed end of the rotary drum and a rotary bearing that allows the rolling body to roll on the inner side of the rotary drum wall and which connects the rolling body to the mounting device. The rotary drum further including an oblong scraping device which is arranged between the mounting device and the rotary bearing wherein the scraping device is mounted on the mounting device such that it is able to carry out a pendulum motion in at least one direction, but is unable to turn about itself. Furthermore, the end of the scraping device which is on the side of the rotary bearing is connected to the rotary bearing in such a way that it is able to carry out a pendulum motion in at least one direction (coordinate). The invention is based on the notion that the cleaning of the inner rotary drum wall can only be carried out in a truly efficient fashion in the region situated directly adjacent to the stationary feed end and in the ensuing region if an oblong scraping device is arranged between the pivot (rotary) bearing of the rolling body which rolls on the inner rotary drum wall, and the mounting device for the rolling body at the end wall on the feed side, wherein the oblong scraping device is able to carry out a pendulum motion, but unable to turn about itself. Due to this solution, the rolling body is provided with a substantial freedom of motion and constantly moved in the rotating direction by the rotating rotary drum in a particularly effective fashion, whereafter the rolling body rolls back in the direction of the rotary drum bottom. In this case, the rolling body carries out a significant pendulum motion transverse to the axis of the rotary drum. This results in a significantly improved transmission of power and motion on the end of the oblong scraping device which is situated distant from the feed side. This means that the scraping device carries out a very intense pendulum motion, during which the scraping device exerts correspondingly high cleaning forces upon the critical feed region of the rotary drum with its scraping strips. The arrangement according to the invention improves the cleaning effect in the feed region, as well as in the axial region of the rotary drum situated directly adjacent thereto, i.e., in the regions of the rotary drum in which the risk of deposits becoming caked and encrusted on the inner wall of the rotary drum is particularly high. The invention also makes it possible to withstand process temperatures up to 1150° C.

According to a further aspect of the invention, the objective is attained with a rotary drum that includes a rolling body arrangement for cleaning the interior of the rotary drum. The rotary drum having a stationary feed end for the material to be treated and a mounting device for mounting the rolling body arrangement on to the feed end of the rotary drum. The rolling body arrangement having a rotary bearing which also includes a hinged or swivel bearing, such as a cardan or universal joint, that allows the rolling body to roll on the inner side of the rotary drum wall and connects the rolling body to the mounting device. The hinge or swivel bearing having coatings, linings or bearing bushings consisting of a self-lubricating material that is resistant to high temperature and/or corrosion, wherein the coatings, linings or bearing bushings have a cylindrical shape and/or the shape of an annular disc and which are arranged between the cooperating bearing surfaces of the rotary bearing as well as of the hinge or drag bearings respectively. It was recognized that a separation of axially and radially stressed bearing surface regions significantly improves the mobility of rolling and/or scraping cleaning bodies.

In order to also achieve the desired low-maintenance operation of the cleaning body bearings when carrying out chemical processes in the rotary drums at elevated temperatures, e.g., the carbonization of various substances such as oil residues, coal-tar asphaltums, chemical and other wastes and residues, the invention proposes to manufacture the coatings, linings or bearing bushings arranged between the axial and radial bearings surfaces of a self-lubricating material that is resistant to high temperatures and/or corrosion.

The invention makes it possible to achieve a significantly improved mobility of the cleaning bodies which results in a superior cleaning effect and a substantially longer service life of the cleaning body bearings—namely also at elevated temperatures of, for example, between 600° C. and 850° C. such as occur during carbonization process in rotary drums. In addition to using graphite as the bearing coating, metal-impregnated graphite bearings, special graphite bearings or ceramic bearings may, in particular, be considered for this purpose,—as well known in the art per se. The hinge bearings and pivot bearings according to the invention may be designed such that sliding speeds up to approximately 10 m/s and specific surface loads up to approximately 3 N/mm2 can be tolerated. In this case, an excellent rotary motion, sliding motion and/or pivoting or pendulum motion of the cleaning bodies can be permanently ensured. The invention also makes it possible to withstand process temperatures up to 1150° C. Further improvements include at least one hinge or swivel bearing arrangement, e.g., cardan or universal joints which includes pivot pins at right angles to one another and provides the pendulum motion of the scraping device. Even another advantage relates to utilizing the hinge or swivel bearing arrangement between the scraping device and the rolling body arrangement for the pendulum movement only and utilizing a rotary bearing for allowing the rolling body arrangement to turn about its axis. Further improvements relate to utilizing self-lubricating coatings, linings or bearing bushings between the cooperating bearing surfaces of the rotating bearings or of the universal joint or both. The self-lubricating coatings, linings or bearing bushings described above can consist of pure graphite, carbon-graphite, metal-impregnated graphite (e.g., with antimony, copper, bronze, nickel, silver, etc.) or of a ceramic material, e.g., silicon carbide, etc. Furthermore, utilizing coatings, linings or bearing bushings consisting of materials that are resistant to high temperatures and which are arranged between the cooperating bearing surfaces of the rotary bearing or of the universal joints, or both allows the device to be utilized in high temperature environments. The coatings, linings or bearing bushings can also consist of materials that are resistant to corrosion since these devices are used in harsh environments. In addition, the rotary bearing can contain a cantilever pin with axial and radial bearing surfaces and a bearing cage that surrounds the cantilever pin and which has corresponding axial and radial bearing surfaces for the cantilever pin. Furthermore, the cantilever pin can be carried by a frame or housing that surrounds the pin and the bearing cage.

The aforementioned components, as well as the claimed components and the components to be used in accordance with the invention in the described embodiments, are not subject to any special exceptions with respect to their size, shape, material selection and technical concept such that the selection criteria known in the pertinent field can be applied without limitations.

Additional details, characteristics and advantages of the object of the invention are disclosed in the subclaims and the following description of the respective figures—which in an exemplary fashion—show one preferred embodiment of the rotary drum according to the invention with a scraping body/cleaning body combination.

BRIEF DESCRIPTION OF THE DRAWINGS

The foregoing improvements, objects, and others will in part be obvious and in part be pointed out more fully hereinafter in conjunction with the written description of the preferred embodiments of the invention shown in the accompanying drawings, in which:

FIG. 2 a top view of a combined rolling body and scraping body arrangement for the rotary drum 10 according to FIG. 1 in three operating positions (0°, 10° and 20°);

DETAILED DESCRIPTION OF THE INVENTION

Figure 1:
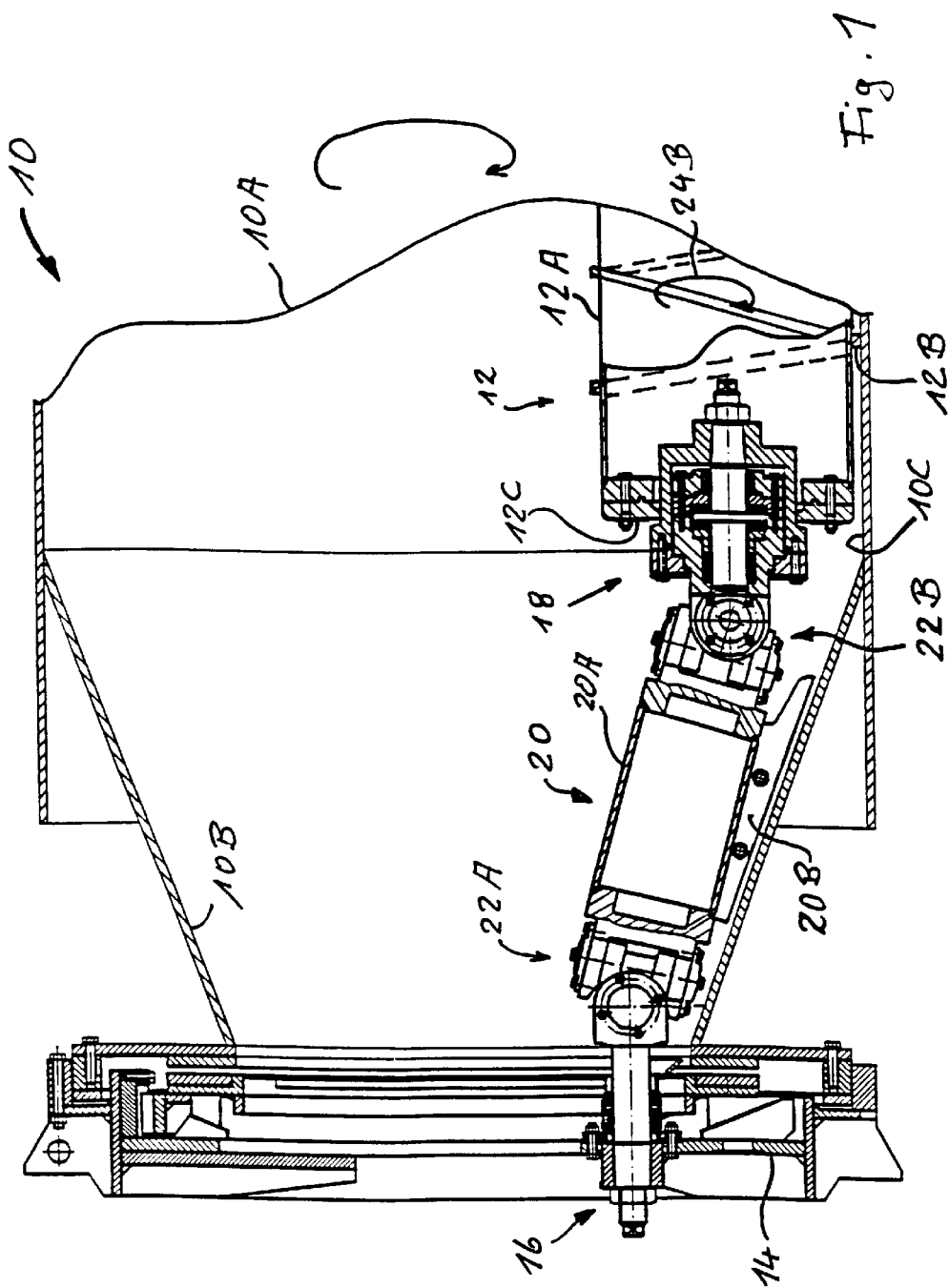
FIG. 1 a longitudinal section through part of a rotary drum.

Referring now to the drawings wherein the showings are for the purpose of illustrating preferred embodiments of the invention only and not for the purpose limiting the same, FIG. 1 shows a rotary drum 10 for carrying out chemical processes at elevated temperatures, e.g., carbonization processes. This rotary drum has a cylindrical region 10A and a conical region 10B on the end situated on the feed side.

A rolling body arrangement 12 for cleaning the interior of the drum consists of a slightly conical rolling body 12A with cleaning elements 12B on the outer sides. The stationary feed end 14 of the rotary drum 10 is provided with a mounting device 16 that is connected to the feed end 14 in a non-rotationally rigid fashion and serves for holding the rolling body arrangement 12 at a distance from the feed end 14. A pivot (rotary) bearing 18 that is connected to the mounting device 16 with one end and to the rolling body arrangement 12 with the other end makes it possible for the rolling body 12A to roll along the inner circumference of the rotary drum 10 that rotates about its longitudinal axis, i.e., along the rotary drum wall 10C.

Figure 3:
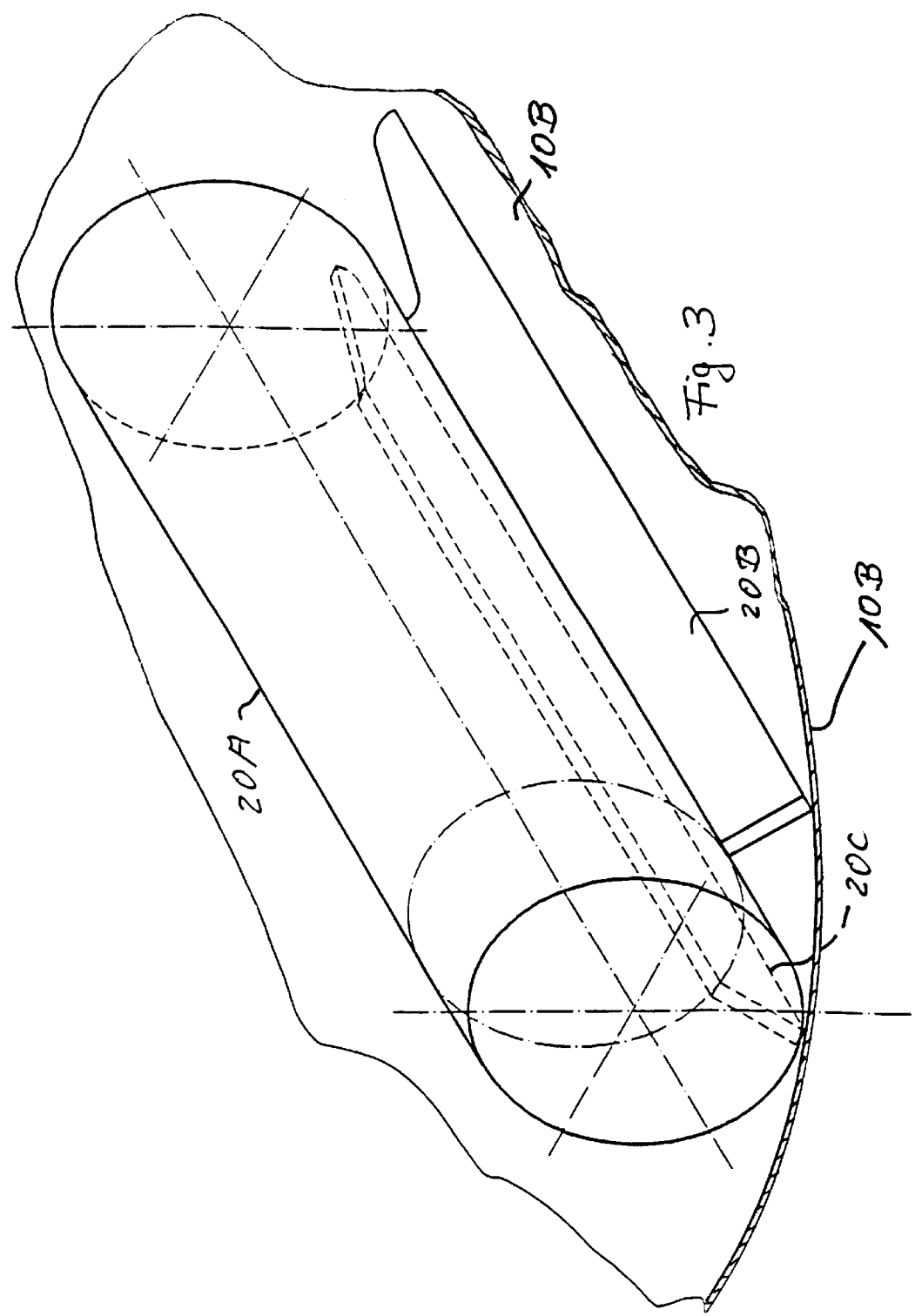
FIG. 3 a simplified perspective representation of the scraping device according to FIG. 1 and FIG. 2.

An oblong scraping device 20 is inserted between the mounting device 16 and the rotary bearing 18. In the preferred embodiment shown in FIG. 1 and FIG. 3, this scraping device consists of a cylindrical scraping body 20A with two scraping strips 20B, 20C that are asymmetrically distributed over the circumference and essentially aligned parallel to the scraping body. The scraping device 20 is mounted on the mounting device 16 such that it is able to carry out a pendulum motion, but unable to turn about itself. This pendulum motion is achieved with a first cardan or universal joint 22A with offset crossheads that are described in greater detail below with reference to FIG. 5. On its end on the side of the pivot bearing, the scraping device 20 is connected to the rotary bearing 18 such that it is able to carry out a pendulum motion in at least one direction. A universal joint 22B that is comparable to the universal joint 22A is used for this purpose. These two universal joints respectively ensure a pivoted connection similar to a cardan joint between the scraping device 20 and the mounting device 16 and between the scraping device and the rotary bearing 18, namely in the horizontal and the vertical direction. Due to these measures, it is possible to move the rolling body arrangement 12 by a certain distance in the rotating direction of the rotating rotary drum due to the friction between the rolling body 12A and the inner rotary drum wall 10C, whereafter the rolling body arrangement—as being allowed by said rotary bearing 18 between its end face 12C and said universal joint 22B—rolls in the direction of the rotary drum bottom opposite to the rotational movement of the rotary drum due to the incline toward the rotary drum bottom. However, this movement only rarely occurs axially parallel to the rotary drum—not only because of the one-sided connection of the rolling body to the feed end 14. Since the rolling body 12A widens toward the feed end in a slightly conical fashion, its end on the feed side moves opposite to the rotating direction of the rotary drum 10 and its other end moves in the rotating direction (due to dragging). Since the rolling body is slightly moved by the rotary drum, the rolling body end on the feed side with the pivot bearing 18 arranged at this location is subjected to a lateral excursion opposite to the rotating direction of the rotary drum from its idle position in the drum bottom.

Due to this excursion, the end of the scraping device 20 on the side of the rolling body and the universal joint 22B arranged at this location may, under certain circumstances, carry out a very significant pendulum motion referred to the end of the scraping device 20 that is held by the mounting device 16 on the feed end 14. The utilization of the two universal joints causes the scraping bodies 20A and the scraping strips 20B and 20C to carry out a pure pendulum motion along the inner wall surface of the conical rotary drum region 10B, i.e., without turning about the longitudinal axis of the scraping body 20A. These circumstances are illustrated in FIG. 2 by straight and circular arrows 24A and 24B. In addition to the 0° position of the scraping device 20 and the rolling body arrangement 12, this figure also shows the 10° position and the 20° position of the scraping device and the rolling body arrangement referred to the straight idle position (0° position) in the rotary drum bottom.

Figure 4:
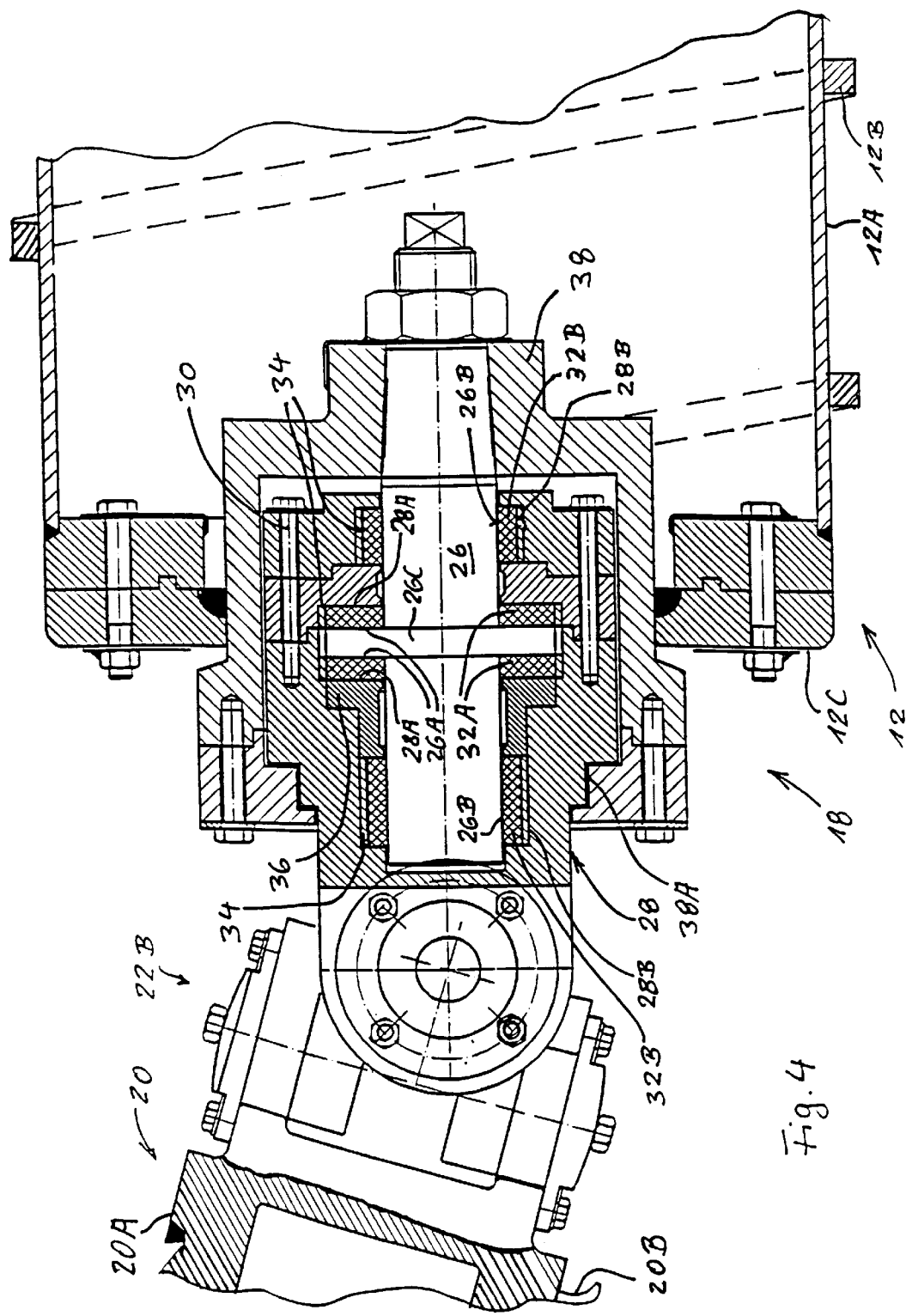
FIG. 4 an enlarged detail of the rolling body/scraping body combination according to FIGS. 1–3 in the form of an axial section, FIG. 5 a detail of a universal joint of the scraping device according to FIGS. 1 and 2 in the form of an axial section through one of the two bearing journals, and FIG. 6 an enlarged detail of the mounting device of the rolling body/scraping body combination according to FIG. 1 in the form of an axial section.

As shown in FIG. 4 in more detail. In order to largely separate the pendulum motion of the scraping device 20 from the rolling motion of the rolling body arrangement 12, the rotary bearing 18 consists of a cantilever pin 26 with axial bearing surfaces 26A and radial bearings surfaces 26B. For this purpose, the cantilever pin 26 has a cylindrical shape and carries a circumferential flange-like collar 26C in its central region, wherein plane ring surfaces are arranged to both sides of the collar. The cantilever pin 26 is surrounded by a bearing cage 28 with axial bearing surfaces 28A and radial bearings surfaces 28B which correspond to the bearings surfaces 26A and 26B of the cantilever pin 26. A simple assembly of the bearing cage and the cantilever pin is ensured due to the segmented design of the bearing cage and the use of connecting screws 30 for the cage segments. This type of rotary bearing is of own inventive merit.

In order to also ensure sufficiently long maintenance intervals of the rotary bearing at the typically high operating temperatures for various carbonization processes, self-lubricating linings 32A and 32B that are resistant to high temperatures are arranged between the cooperating bearing surfaces 26A/28A and 26B/28B. These linings preferably have the shape of annular disks or pipe sections. However, they may also be arranged in the form of segments between the bearing surfaces, in particular, at a distance from one another. Bushings 34 and fitting elements 36 make it possible to compensate dimensional tolerances of the linings relative to the bearings surfaces. This type of rotary bearing is of own inventive merit as well.

The cantilever pin 26 that may be directly screwed into the center of the end face 12C of the rolling body arrangement 12 in a rotationally rigid fashion is preferably surrounded and carried by a frame or, as illustrated in the particularly preferred embodiment according to FIG. 4, a housing 38. This frame or housing also surrounds the bearing cage 28 and protects the rotary bearing 18 from becoming soiled by means of a labyrinth seal 38A. On the free end of the cantilever pin 26, the pivot bearing cage 28 that is realized similar to a housing is closed and directly connected to the universal joint 22B.

Figure 5:
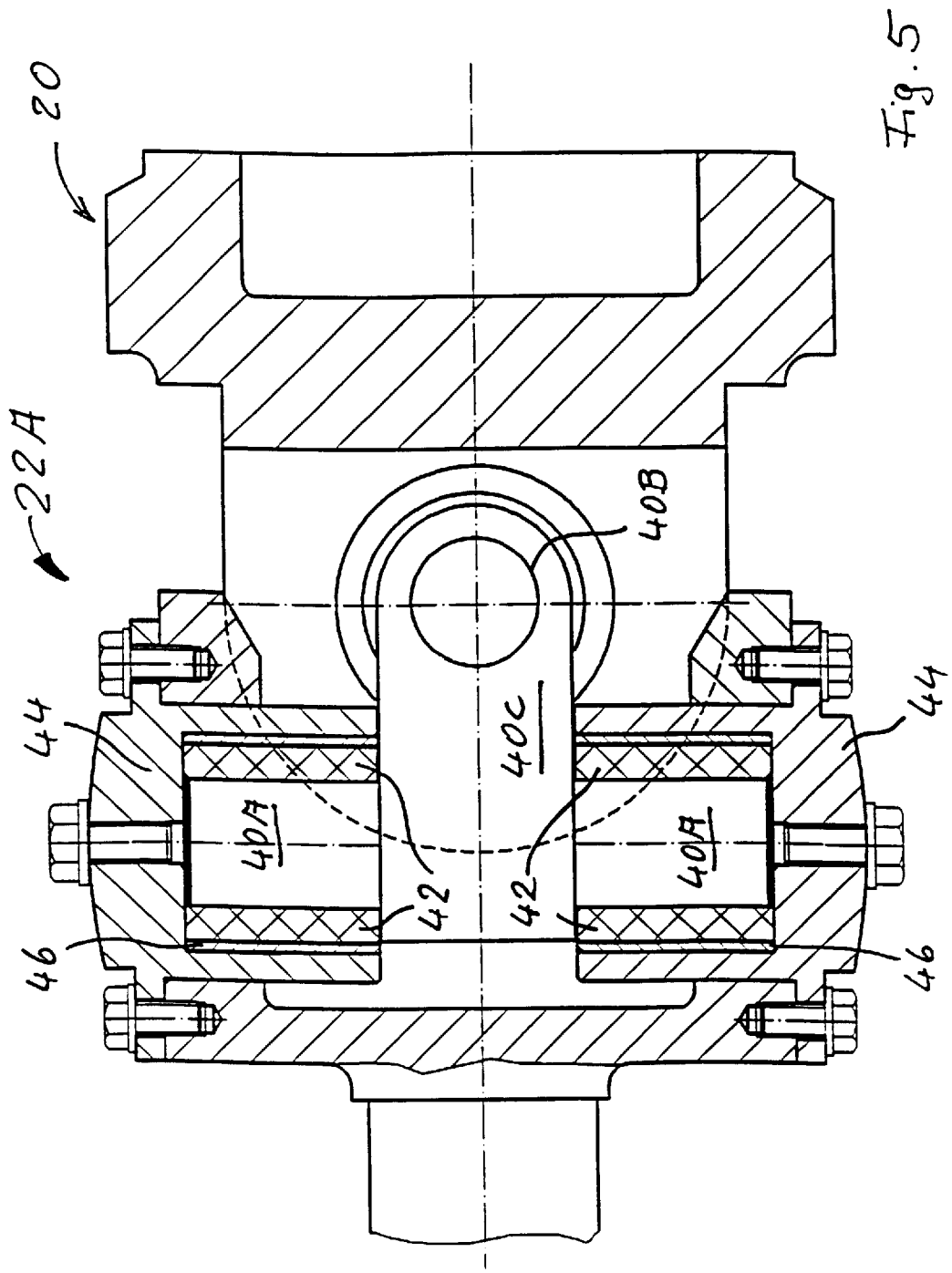
Figure 6:
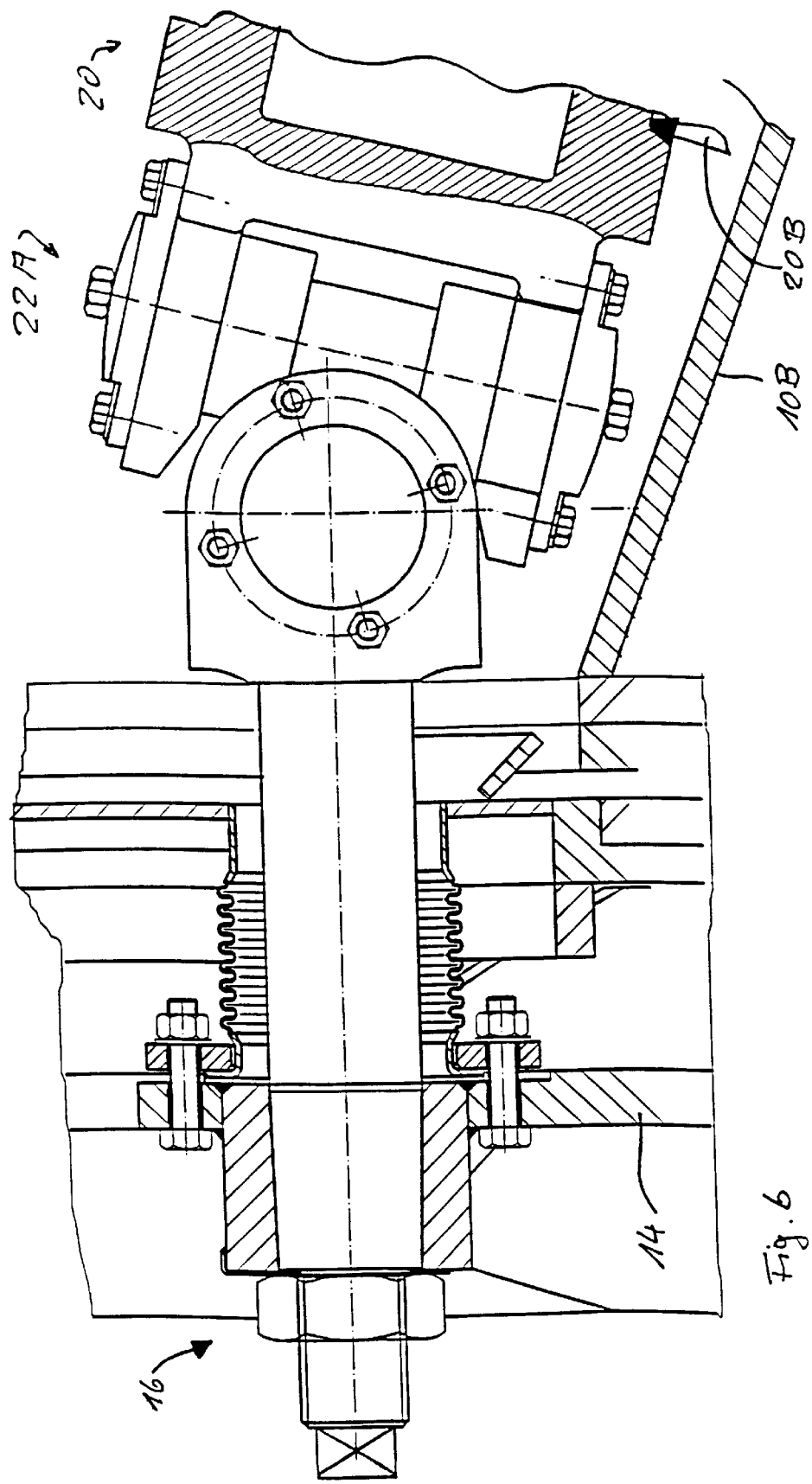

The two universal joints 22A and 22B are designed analogous to the one universal joint half shown in FIG. 5. The interconnected pivot pins 40A and 40B that—at a distance—extend orthogonally to one another respectively protrude from their connecting arm 40C on both sides. Their outer circumference forms cylindrical, radial bearing surfaces that are surrounded by linings 42 of a self-lubricating material that is resistant to high temperatures, namely similar to the radial bearings of the rotary bearing 18. Housing caps 44 and bushings 46 promote a precisely fitted assembly and long maintenance intervals of the drag bearings (universal joints 22A and 22B).

While considerable emphasis has been place herein on the specific structures and structural interrelationships between the component parts of the preferred embodiments of the invention, it will be appreciated that other embodiments can be made and that many changes can be made in the preferred embodiments without departing from the principles of the invention. Accordingly, it is to be distinctly understood that the foregoing descriptive matter is to be interpreted merely as illustrative of the present invention and not as a limitation.

What is claimed is:

1. A cleaning arrangement for cleaning the interior of a rotary drum, the rotary drum being used for carrying out chemical processes at elevated temperatures, and having a stationary feed end for the material to be treated, a mounting device for mounting said arrangement on the feed end of the rotary drum, said cleaning arrangement comprising: a rolling body arrangement; a rotary bearing that allows said rolling body arrangement to roll on the inner side of the rotary drum wall about a rolling body axis and connects the rolling body arrangement to the mounting device; an oblong scraping device which is arranged between the mounting device and said rotary bearing, said scraping device being mounted on the mounting device such that said scraping device is able to carry out a pendulum motion in at least one direction, but unable to turn about itself, the end of said scraping device on the side of said rotary bearing being connected to said rotary bearing such that said scraping device is able to carry out said pendulum motion in at least one direction.

2. The cleaning arrangement according to claim 1, further including at least one swivel bearing arrangement for said pendulum motion.

3. The cleaning arrangement according to claim 2, wherein said at least one swivel bearing arrangement includes a swivel bearing arrangement between said scraping device and said rolling body arrangement which allows for said pendulum movements only, said rotary bearing allowing said rolling body arrangement to turn about said rolling body axis.

4. The cleaning arrangement according to claim 1, wherein said at least one universal joint includes self-lubricating linings.

5. The cleaning arrangement according to claim 4, wherein said linings includes a material that is resistant to high temperatures.

6. The cleaning arrangement according to claim 4, wherein said linings includes a material that is resistant to corrosion.

7. The cleaning arrangement according to claim 1, wherein said rotary bearing includes self-lubricating bushings arranged between the cooperating bearing surfaces of said rotary bearing.

8. The cleaning arrangement according to claim 7 wherein said bushings includes a material that is resistant to high temperatures.

9. The cleaning arrangement according to claim 8, wherein said bushings includes a material that is resistant to corrosion.

10. The cleaning arrangement according to claim 1, wherein said rotary bearing includes self-lubricating bushings.

11. The cleaning arrangement according to claim 10, wherein said bushings includes a material that is resistant to high temperatures.

12. The cleaning arrangement according to claim 10, wherein said bushing includes a material that is resistant to corrosion.

13. A cleaning arrangement for cleaning the interior of a rotary drum, the rotary drum being used for chemical processes that are carried out at elevated temperatures, the rotary drum having a stationary feed end for the material to be treated, a mounting device for mounting said cleaning arrangement on the feed end of the rotary drum, said cleaning arrangement comprising: a rolling body arrangement; a rotary bearing that allows said rolling body arrangement to roll on the inner side of the rotary drum wall about a rolling body axis and connects said rolling body arrangement to the mounting device; a swivel bearing directly connected to one side of said rotary bearing.

14. The cleaning arrangement of claim 13, wherein at least one of said rotary bearing and said swivel bearing includes a self-lubricating material that is resistant to high temperatures.

15. The cleaning arrangement according to claim 14, wherein said self-lubricating material includes at least one of a pure graphite, a carbon-graphite, a metal-impregnated graphite and a ceramic material.

16. The cleaning arrangement according to claim 15, wherein said rotary bearing includes a cantilever pin with axial and radial bearings surfaces and a bearing cage, said bearing cage surrounds said cantilever pin and has corresponding axial and radial bearings surfaces for engaging said axial and radial surfaces of said cantilever pin.

17. The cleaning arrangement according to claim 16, wherein said cantilever pin is carried by a housing that surrounds said cantilever pin and said bearing cage.

18. The cleaning arrangement of claim 13, wherein at least one of said rotary bearing and said swivel bearing includes a self-lubricating material that is resistant to corrosion.

19. The cleaning arrangement according to claim 13, wherein said self-lubricating material includes at least one of a pure graphite, a carbon-graphite, a metal-impregnated graphite and a ceramic material.

20. The cleaning arrangement of claim 13, wherein said swivel bearing, contain at least one of a coating, lining and bearing bushing which includes a self-lubricating material that is resistant to high temperatures, said at least one coating, lining and bearing bushing having a cylindrical shape and/or the shape of an annular disk and are arranged between cooperating bearing surfaces of said rotary bearing as well as of said swing bearings.

21. The cleaning arrangement according to claim 13, wherein said rotary bearing includes a cantilever pin with axial and radial bearings surfaces and a bearing cage, said bearing cage surrounds said cantilever pin and has corresponding axial and radial bearings surfaces for engaging said axial and radial surfaces of said cantilever pin.

22. The cleaning arrangement according to claim 13, wherein said cantilever pin is carried by a housing that surrounds said cantilever pin and said bearing cage.

23. A cleaning arrangement for cleaning the interior of a rotary drum, the rotary drum being used for chemical processes that are carried out at elevated temperatures and having a stationary feed end for the material to be treated, a mounting device for mounting said cleaning arrangement on the feed end of the rotary drum, said cleaning arrangement comprising: a rolling body arrangement, a rotary bearing that allows said rolling body to roll on the inner side of the rotary drum wall about a rolling body axis and connects said rolling body arrangement to the mounting device; at least one swivel bearing; said rotary bearing and said at least one swivel bearings containing at least one of a coating, a lining and a bearing bushing which includes a self-lubricating material.

24. The cleaning arrangement according to claim 23, wherein said self-lubricating materials is heat resistant.

25. The cleaning arrangement according to claim 23, wherein said self-lubricating material is corrosion resistant.

26. The cleaning arrangement according to claim 23, wherein said self-lubricating material is one of a pure graphite, a carbon-graphite, a metal-impregnated graphite and a ceramic material.

27. The cleaning arrangement according to claim 26, wherein said at least one swivel bearing includes a swivel bearing directly attached to said rotary bearing.

28. The cleaning arrangement according to claim 27, wherein said rotary bearing includes a cantilever pin with axial and radial bearings surfaces and a bearing cage that surrounds said cantilever pin, said bearing cage has corresponding axial and radial bearings surfaces for engaging said axial and radial surfaces of said cantilever pin.

29. The cleaning arrangement according to claim 28, wherein said cantilever pin is carried by a housing that surrounds said cantilever pin and said bearing cage.

30. The cleaning arrangement according to claim 23, wherein said at least one swivel bearing includes a swivel bearing directly attached to said rotary bearing.

31. The cleaning arrangement according to claim 23, wherein said rotary bearing contains a cantilever pin with axial and radial bearings surfaces and a bearing cage that surrounds said cantilever pin, said bearing cage having corresponding axial and radial bearings surfaces for said cantilever pin.

32. The cleaning arrangement according to claim 31, wherein said cantilever pin is carried by a housing that surrounds said cantilever pin and said bearing cage.

33. The cleaning arrangement according to claim 23, wherein said at least one of a coating, a lining and a bearing bushing has a cylindrical shape and is arranged between cooperating bearing surfaces of said rotary bearing and said swivel bearings.

34. The cleaning arrangement according to claim 23, wherein said at least one of a coating, a lining and a bearing bushing has an annular disk shape and is arranged between cooperating bearing surfaces of said rotary bearing and said swivel bearings.

* * * * *